(12) United States Patent
Liang et al.

(10) Patent No.: US 11,630,340 B2
(45) Date of Patent: Apr. 18, 2023

(54) STEREOSCOPIC DISPLAY DEVICE AND METHOD FOR MANUFACTURING THEREOF

(71) Applicants: Chengdu BOE Optoelectronics Technology Co., Ltd., Chengdu (CN); BOE Technology Group Co., Ltd., Beijing (CN)

(72) Inventors: Cuicui Liang, Beijing (CN); Bing Zhang, Beijing (CN)

(73) Assignees: Chengdu BOE Optoelectronics Technology Co., Ltd., Sichuan (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 17/264,828

(22) PCT Filed: May 27, 2020

(86) PCT No.: PCT/CN2020/092734
§ 371 (c)(1),
(2) Date: Jan. 31, 2021

(87) PCT Pub. No.: WO2020/238993
PCT Pub. Date: Dec. 3, 2020

(65) Prior Publication Data
US 2021/0294154 A1    Sep. 23, 2021

(30) Foreign Application Priority Data

May 30, 2019    (CN) .......................... 201910464278.7

(51) Int. Cl.
*G02F 1/1335* (2006.01)
*H04N 13/30* (2018.01)
(Continued)

(52) U.S. Cl.
CPC .... *G02F 1/133528* (2013.01); *G02F 1/13363* (2013.01); *G02F 1/133711* (2013.01); *H04N 13/30* (2018.05)

(58) Field of Classification Search
CPC ......... G02F 1/133528; G02F 1/133541; G02F 1/13363; G02F 1/133638; G02F 1/133711;
(Continued)

(56) References Cited

U.S. PATENT DOCUMENTS

2002/0145682 A1    10/2002  Kwon et al.
2010/0060721 A1     3/2010  Chen et al.
(Continued)

FOREIGN PATENT DOCUMENTS

CN        101183177 A      5/2008
CN        102169200 A      8/2011
(Continued)

OTHER PUBLICATIONS

CN201910464278.7 First Office Action.
CN201910464278.7 Second Office Action.

*Primary Examiner* — Jia X Pan
(74) *Attorney, Agent, or Firm* — IPro, PLLC

(57) ABSTRACT

The present disclosure can provide a stereoscopic display device and a method for manufacturing thereof. The stereoscopic display device includes first display areas and second display areas which are alternately provided, and further includes: a base substrate; a plurality of display components located on the base substrate of the first display area and the second display area; a first polarizing film, formed on one side of the display components of the first display area facing away from the base substrate; and a second polarizing film, formed on one side of the display components of the second display area facing away from the base substrate.

(Continued)

The absorption axis direction of the first polarizing film is perpendicular to that of the second polarizing film.

9 Claims, 8 Drawing Sheets

(51) Int. Cl.
    *G02F 1/1337*     (2006.01)
    *G02F 1/13363*     (2006.01)

(58) Field of Classification Search
    CPC ...... H04N 13/30; H04N 13/337; G02B 30/25; G02B 5/3083; G02B 5/3025; G02B 5/3033
    See application file for complete search history.

(56) References Cited

U.S. PATENT DOCUMENTS

| | | |
|---|---|---|
| 2011/0298792 A1 | 12/2011 | Lim |
| 2012/0307168 A1 | 12/2012 | Dong et al. |
| 2012/0307360 A1 | 12/2012 | Wu et al. |
| 2012/0327336 A1 | 12/2012 | Jeon et al. |
| 2013/0329142 A1 | 12/2013 | Lee |
| 2014/0191203 A1* | 7/2014 | Son ...................... H01L 51/524 257/40 |
| 2014/0192303 A1 | 7/2014 | Shibata et al. |
| 2015/0129852 A1* | 5/2015 | Park .................... H01L 27/3262 257/40 |
| 2016/0033782 A1* | 2/2016 | Wang ................... G02B 5/3083 359/465 |
| 2016/0238881 A1 | 8/2016 | Chong et al. |
| 2017/0293058 A1* | 10/2017 | Lee ...................... G02B 5/3041 |
| 2021/0191144 A1* | 6/2021 | Liang .................... G02B 30/28 |

FOREIGN PATENT DOCUMENTS

| | | | | |
|---|---|---|---|---|
| CN | 102193248 A | | 9/2011 | |
| CN | 102213865 A | | 10/2011 | |
| CN | 102279484 A | | 12/2011 | |
| CN | 102331636 A | | 1/2012 | |
| CN | 102540550 A | | 7/2012 | |
| CN | 102722045 A | | 10/2012 | |
| CN | 102842271 A | | 12/2012 | |
| CN | 103718072 A | | 4/2014 | |
| CN | 103852896 A | | 6/2014 | |
| CN | 105742319 A | | 7/2016 | |
| CN | 107209310 A | * | 9/2017 | ........... G02B 5/3016 |
| CN | 108681155 A | | 10/2018 | |
| CN | 110133864 A | | 8/2019 | |
| CN | 110471212 A | * | 11/2019 | ....... G02F 1/133528 |
| CN | 110989191 A | * | 4/2020 | ............ G02B 30/28 |
| TW | 201011345 A | | 3/2010 | |

\* cited by examiner

STEREOSCOPIC DISPLAY DEVICE AND METHOD FOR MANUFACTURING THEREOF

CROSS REFERENCE TO RELATED APPLICATIONS

The present application claims priority from Chinese Patent Application No. 201910464278.7, filed on May 30, 2019, in the China National Intellectual Property Administration and entitled "Stereoscopic Display Apparatus and Manufacturing Method Therefor", the entire contents of which are incorporated herein by reference.

FIELD

The present disclosure relates to the technical field of display, in particular to a stereoscopic display device and a method for manufacturing thereof.

BACKGROUND

With more and more applications of the stereoscopic display technology in the fields such as television broadcast, video games, medical treatment and education, stereoscopic display has been developed from movie screens to television terminals, computer terminals, smart phone terminals, tablet personal computer terminals, etc. At present, mainstream stereoscopic display includes stereoscopic vision, helmet type displayers, cave automatic virtual environment (CAVE), naked eye stereoscopic displayers, true 3D display, etc. The stereoscopic display technology can be divided into holographic and non-holographic types, wherein non-holographic stereoscopic display is mainly divided into two main types, i.e., the glasses type stereoscopic display technology and the naked-eye type stereoscopic display technology, and the technical principle of the glasses type stereoscopic display technology has three types: Anaglyphic 3D, Polarization 3D and Active Shutter 3D.

SUMMARY

Embodiments of the present disclosure provide a stereoscopic display device, the stereoscopic display device includes first display areas and second display areas alternately provided, and the stereoscopic display device further includes:
 a base substrate;
 a plurality of display components, located above the base substrate of one first display area and one second display area;
 a first polarizing film, disposed on one side, facing away from the base substrate, of the display components of the first display area; and
 a second polarizing film, disposed on one side, facing away from the base substrate, of the display components of the second display area;
 where an absorption axis direction of the first polarizing film is perpendicular to an absorption axis direction of the second polarizing film.

Optionally, in some embodiments of the present disclosure, the stereoscopic display device further includes:
 a first one-quarter wavelength phase difference film, disposed between the display components of the first display area and the first polarizing film;
 a second one-quarter wavelength phase difference film, disposed between the display components of the second display area and the second polarizing film;
 a first one-half wavelength phase difference film, disposed between the first one-quarter wavelength phase difference film of the first display area and the first polarizing film; and
 a second one-half wavelength phase difference film, disposed between the second one-quarter wavelength phase difference film of the second display area and the second polarizing film.

Optionally, in some embodiments of the present disclosure, an angle between a slow axis direction of the first one-quarter wavelength phase difference film and the absorption axis direction of the first polarizing film is 75°;
 an angle between a slow axis direction of the second one-quarter wavelength phase difference film and the absorption axis direction of the second polarizing film is 75°;
 an angle between a slow axis direction of the first one-half wavelength phase difference film and the absorption axis direction of the first polarizing film is 15°; and
 an angle between a slow axis direction of the second one-half wavelength phase difference film and the absorption axis direction of the second polarizing film is 15°.

Optionally, in some embodiments of the present disclosure, the first one-quarter wavelength phase difference film and the second one-quarter wavelength phase difference film each include a polymeric liquid crystal material; and
 the stereoscopic display device further includes:
 a first optical alignment film, disposed between the display components of the first display area and the first one-quarter wavelength phase difference film; and
 a second optical alignment film, disposed between the display components of the second display area and the second one-quarter wavelength phase difference film;
 where
 an alignment direction of the first optical alignment film is perpendicular to an alignment direction of the second optical alignment film.

Optionally, in some embodiments of the present disclosure, the first one-half wavelength phase difference film and the second one-half wavelength phase difference film each include a polymeric liquid crystal material; and
 the stereoscopic display device further includes:
 a third optical alignment film, disposed between the first one-quarter wavelength phase difference film of the first display area and the first one-half wavelength phase difference film; and
 a fourth optical alignment film, disposed between the second one-quarter wavelength phase difference film of the second display area and the second one-half wavelength phase difference film; where
 an alignment direction of the third optical alignment film is perpendicular to an alignment direction of the fourth optical alignment film.

Optionally, in some embodiments of the present disclosure, the first polarizing film includes dichroic dyes and polymeric liquid crystal mixtures, and the second polarizing film includes dichroic dyes and polymeric liquid crystal mixtures; and
 the stereoscopic display device further includes:
 a fifth optical alignment film, disposed between the first one-half wavelength phase difference film of the first display area and the first polarizing film; and a sixth optical alignment film, disposed between the second one-half wavelength phase difference film of the second display area and the second polarizing film; where an alignment direction of the fifth optical alignment film is perpendicular to an alignment direction of the sixth optical alignment film.

Optionally, in some embodiments of the present disclosure, the first display areas and the second display areas are alternately distributed in a first direction; and/or the first display areas and the second display areas are alternately distributed in a second direction; where the second direction crosses the first direction.

Optionally, in some embodiments of the present disclosure, the stereoscopic display device further includes: a pixel defining layer configured to separate the display components; where the pixel defining layer includes: shading parts, each located at position between a pair of adjacent the first and second display areas.

Optionally, in some embodiments of the present disclosure, the shading parts include black resin materials.

Correspondingly, the embodiments of the present disclosure further provide a method for manufacturing the above stereoscopic display device, and the method includes:

forming film layers of the display components above the base substrate; and forming the first polarizing film located in the first display area and the second polarizing film located in the second display area, on one side, facing away from the base substrate, of the display components;

where an absorption axis direction of the first polarizing film is perpendicular to an absorption axis direction of the second polarizing film.

Optionally, in some embodiments of the present disclosure, after the film layers of the display components are formed above the base substrate, and before the first polarizing film located in the first display area and the second polarizing film located in the second display area are formed on the side, facing away from the base substrate, of the display components, the method further includes:

coating a first optical alignment layer over the display components;

performing a photo-alignment process for the first optical alignment layer located in the first display area to form a first optical alignment film;

performing another photo-alignment process for the first optical alignment layer located in the second display area to form a second optical alignment film, where an alignment direction of the first optical alignment film is perpendicular to an alignment direction of the second optical alignment film; and coating polymeric liquid crystal materials over the first optical alignment film and the second optical alignment film, and curing the polymeric liquid crystal materials to form a first one-quarter wavelength phase difference film and a second one-quarter wavelength phase difference film.

Optionally, in some embodiments of the present disclosure, after the first one-quarter wavelength phase difference film and the second one-quarter wavelength phase difference film are formed, and before the first polarizing film located in the first display area and the second polarizing film located in the second display area are formed on the side, facing away from the base substrate, of the display components, the method further includes:

coating a second optical alignment layer over the first one-quarter wavelength phase difference film and the second one-quarter wavelength phase difference film;

performing a photo-alignment process for the second optical alignment layer located in the first display area to form a third optical alignment film;

performing another photo-alignment process for the second optical alignment layer located in the second display area to form a fourth optical alignment film, where an alignment direction of the third optical alignment film is perpendicular to an alignment direction of the fourth optical alignment film; and coating polymeric liquid crystal materials over the third optical alignment film and the fourth optical alignment film, and curing the polymeric liquid crystal materials to form a first one-half wavelength phase difference film and a second one-half wavelength phase difference film.

Optionally, in some embodiments of the present disclosure, after the first one-half wavelength phase difference films and the second one-half wavelength phase difference film are formed, and before the first polarizing film located in the first display area and the second polarizing film located in the second display area are formed on the side, facing away from the base substrate, of the display components, the method further includes:

coating a third optical alignment layer over the first one-half wavelength phase difference film and the second one-half wavelength phase difference film;

performing a photo-alignment process for the third optical alignment layer located in the first display area to form a fifth optical alignment film; and performing another photo-alignment process for the third optical alignment layer located in the second display area to form a sixth optical alignment film, where an alignment direction of the fifth optical alignment film is perpendicular to an alignment direction of the sixth optical alignment film; and the forming the first polarizing film located in the first display area and the second polarizing film located in the second display area on the sides, facing away from the base substrate, of the display components, includes:

coating dichroic dyes and polymeric liquid crystal mixtures over the fifth optical alignment film and the sixth optical alignment film, and curing the dichroic dyes and polymeric liquid crystal mixtures to form the first polarizing film and the second polarizing film.

Optionally, in some embodiments of the present disclosure, the method further includes: forming shading parts above the base substrate by using black resin materials, each located at a position between a pair of adjacent the first and second display areas.

DETAILED DESCRIPTION OF THE EMBODIMENTS

In a display device in the related art, manufactured polarizers need to be directly pasted to the surface of the display device, each polarizer only has an absorption axis in one direction, and consequently the display device can hardly realize stereoscopic display and is relatively low in integration level.

Based on this, the embodiments of the present disclosure provide a stereoscopic display device and a method for manufacturing thereof. The present disclosure is further described in detail below in conjunction with the accompanying drawings and embodiments. It is understandable that the specific embodiments described herein are merely configured to explain relevant disclosures, but not to limit the disclosure. It should be noted additionally that to facilitate descriptions, only the parts related to the present disclosure are shown in the accompanying drawings.

It should be noted that the embodiments in the present disclosure and features in the embodiments can be combined with each other without conflict. The present disclosure will be described in detail with reference to the accompanying drawings and in combination with the embodiments.

Figure 1:
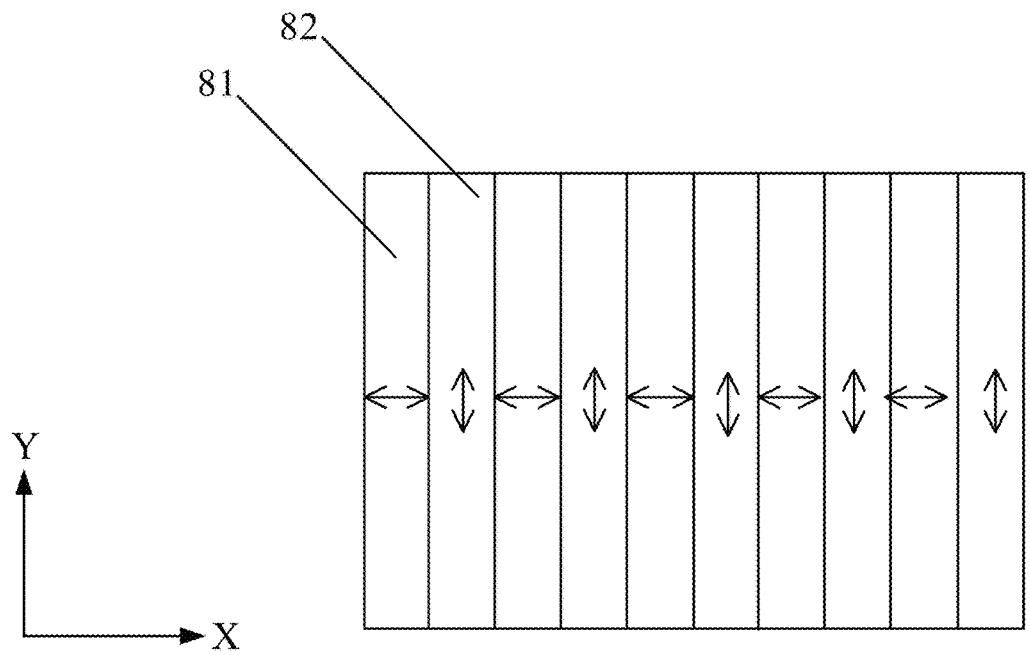
FIG. 1 is a first schematic diagram of a top-view structure of a stereoscopic display apparatus according to an embodiment of the present disclosure.
Figure 2:
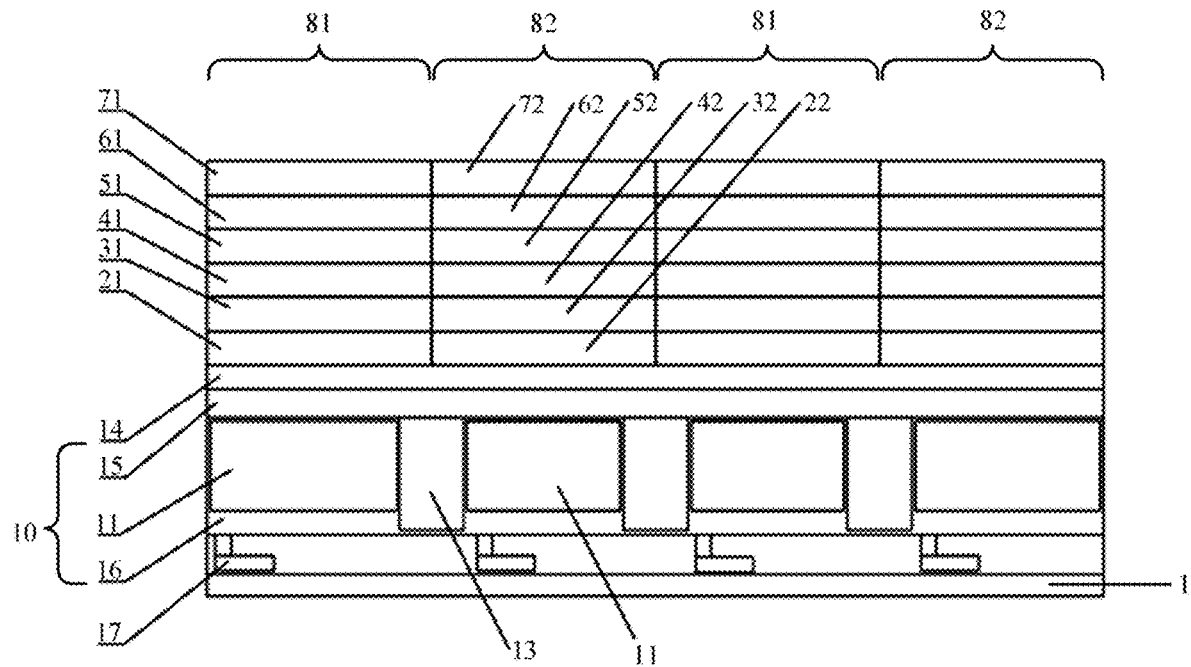
FIG. 2 is a schematic diagram of a cross-sectional structure of a stereoscopic display apparatus according to an embodiment of the present disclosure.

An embodiment of the present disclosure provides a stereoscopic display device. Referring to FIG. 1 and FIG. 2, the stereoscopic display device of the present disclosure includes first display areas 81 and second display areas 82. The first display areas 81 and the second display areas 82 are alternately provided, and the stereoscopic display device further includes:

a base substrate 1, for example, which can be made of a flexible material;

a plurality of display components 10, located above the base substrate 1 of the first display areas 81 and the second display areas 82;

first polarizing films 71, disposed on the sides, facing away from the base substrate 1, of the display components 10 of the first display areas 81; and second polarizing films 72, disposed on the sides, facing away from the base substrate 1, of the display components 10 of the second display areas 82;

where an absorption axis direction of the first polarizing films 71 is perpendicular to that of the second polarizing films 72.

In some embodiments of the present disclosure, the polarization direction of light of a displayed image of the first display area is perpendicular to that of light of a displayed image of the second display area, in cooperation with stereoscopic glasses, the displayed image of the first display area and the displayed image of the second display area will respectively enter different eyes of a person, thereby realizing stereoscopic display. By forming the first polarizing films located in the first display areas and the second polarizing films located in the second display areas on the sides, facing away from the base substrate, of the display components, compared with directly pasting manufactured polarizers to surfaces of display components, the embodiments of the present disclosure may more easily form polarizing films having different absorption axis directions on light emitting sides of the display components, and the thickness of the stereoscopic display device may be reduced, so that the stereoscopic display device is thinner and higher in integration level.

Specifically, the displayed image of the first display areas is formed by light emitted from the display components passing the first polarizing films, and the displayed image of the second display areas is formed by light emitted from the display components passing the second polarizing films. First emitted light is emitted from the display components in the first display areas, light with the polarization direction being parallel to the absorption axes of the first polarizing films in the first emitted light is absorbed, and light with the polarization direction being perpendicular to the absorption axes of the first polarizing films in the first emitted light can pass the first polarizing films. Similarly, second emitted light is emitted from the second display areas, light with the polarization direction being parallel to the absorption axes of the second polarizing films in the second emitted light is absorbed, and light with the polarization direction being perpendicular to the absorption axes of the second polarizing films in the second emitted light can pass the second polarizing films.

During specific implementation, the stereoscopic display device provided by the embodiments of the present disclosure needs to be matched with the stereoscopic glasses to realize stereoscopic display. Specifically, the stereoscopic glasses include a first polarized lens and a second polarized lens. The first polarized lens and the second polarized lens may be made of polarizers, the absorption axis direction of the first polarized lens is perpendicular to that of the second polarized lens, the absorption axis direction of the first polarized lens is consistent with that of the first polarizing films, and the absorption axis direction of the second polarized lens is consistent with that of the second polarizing films. Therefore, in the display process, the light emitted from the first display areas of the stereoscopic display device can only pass the first polarized lens and cannot pass the second polarized lens, and the light emitted from the second display areas of the stereoscopic display device can only pass the second polarized lens and cannot pass the first polarized lens, so that the displayed image of the first display areas and the displayed image of the second display areas respectively enter different eyes of a person, and the two images entering the different eyes are fused by the brain of the person to form a stereoscopic image in the brain of the person.

In practical applications, the absorption axis direction of the first polarizing films may be set to be parallel to the long edges of the stereoscopic display device, and the absorption axis direction of the second polarizing films may be set to be perpendicular to the long edges of the stereoscopic display device. Or, the absorption axis direction of the first polarizing films may be set to be perpendicular to the long edges of the stereoscopic display device, and the absorption axis direction of the second polarizing films may be set to be parallel to the long edges of the stereoscopic display device, so that the stereoscopic display device can adapt to various stereoscopic glasses, and the product universality is improved.

During specific implementation, in the stereoscopic display device provided by the embodiments of the present disclosure, at least three distribution ways of the first display areas and the second display areas can be included as follows.

The first distribution way.

As shown in FIG. 1, the first display areas 81 and the second display areas 82 are alternately distributed in a first direction X.

The second distribution way.

Figure 3:
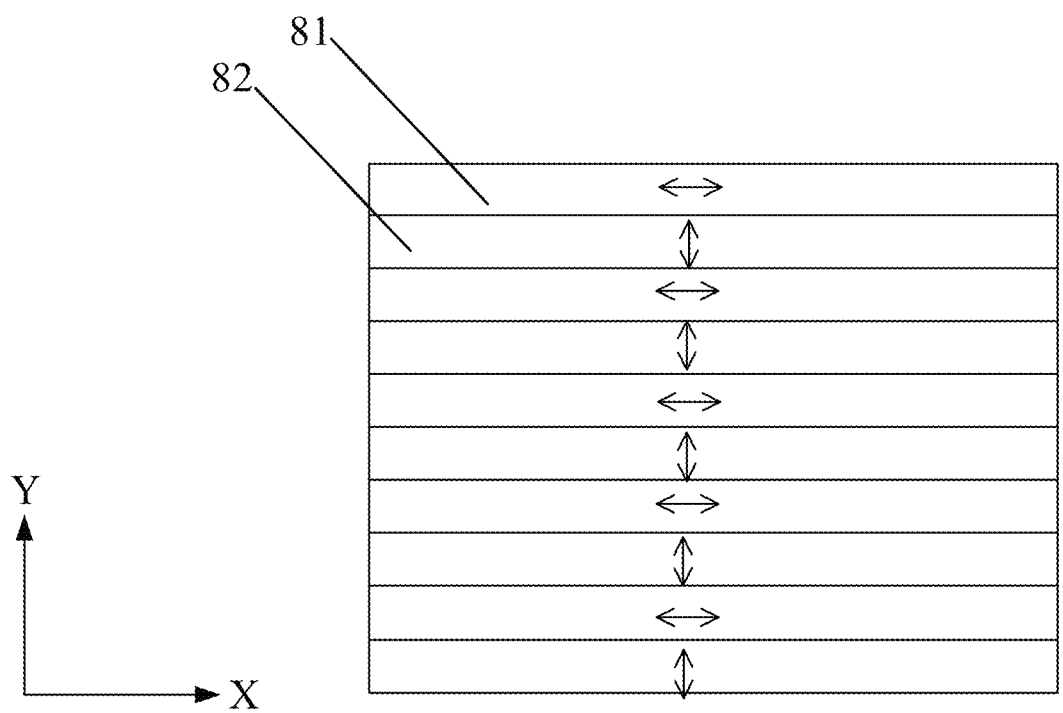
FIG. 3 is a second schematic diagram of the top-view structure of the stereoscopic display apparatus according to the embodiment of the present disclosure.

As shown in FIG. 3, the first display areas 81 and the second display areas 82 are alternately distributed in a second direction Y. The second direction Y is a direction crossing the first direction X.

The third distribution way.

Figure 4:
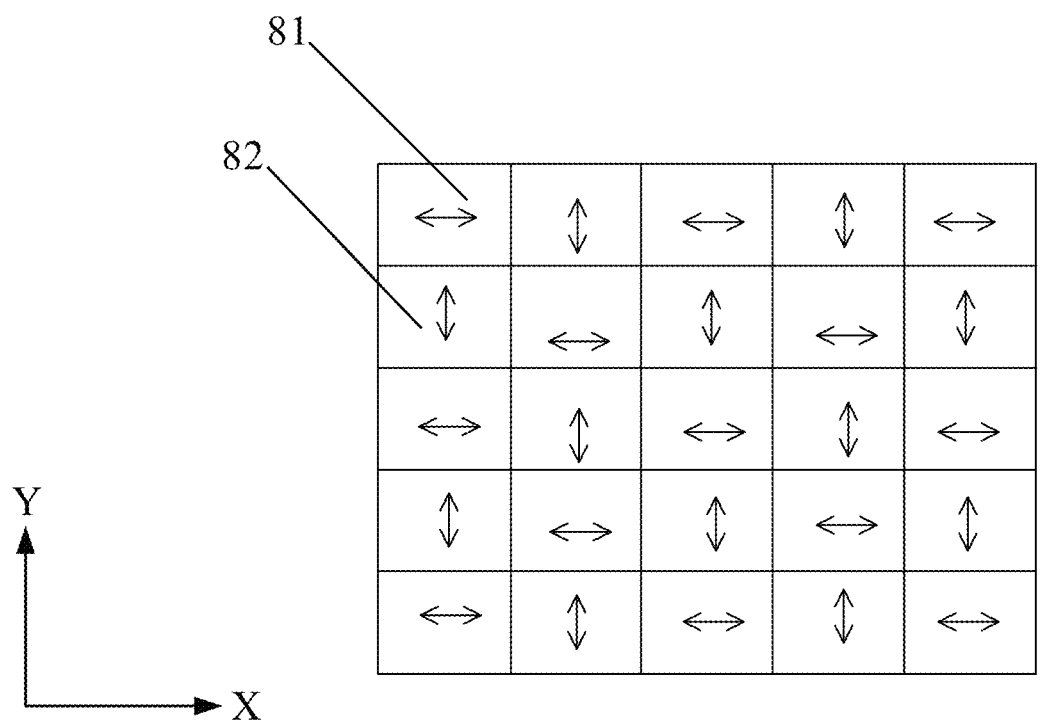
FIG. 4 is a third schematic diagram of the top-view structure of the stereoscopic display apparatus according to the embodiment of the present disclosure.

As shown in FIG. 4, the first display areas 81 and the second display areas 82 are alternately distributed both in the first direction X and the second direction Y. The second direction Y is a direction crossing the first direction X.

That is, the first display areas and the second display areas may be periodically distributed in the first direction, or periodically distributed in the second direction. Or, the first display areas and the second display areas may be periodically distributed both in the first direction and the second direction. Of course, the distribution ways of the first display areas and the second display areas are not limited to the above three, and may be set as actually required during specific implementation, which is not limited herein.

It should be noted that in FIG. 1, FIG. 3 and FIG. 4, arrows of the first direction X or the second direction Y may be understood as representing the absorption axis directions of the first polarizing films or the second polarizing films.

During practical applications, one of the first display areas includes at least one display component, one of the second display areas includes at least one display component, and the number and distribution of the display components in the first display areas and the second display areas may be determined in combination with the distribution way of the first display areas and the second display areas.

Further, the stereoscopic display device provided by the embodiment of the present disclosure, as shown in FIG. 2, may further include:

first one-quarter wavelength phase difference films 31, disposed between the display components 10 of the first display areas 81 and the first polarizing films 71;

second one-quarter wavelength phase difference films 32, disposed between the display components 10 of the second display areas 82 and the second polarizing films 72;

first one-half wavelength phase difference films 51, disposed between the first one-quarter wavelength phase difference films 31 of the first display areas 81 and the first polarizing films 71; and second one-half wavelength phase difference films 52, disposed between the second one-quarter wavelength phase difference films 32 of the second display areas 82 and the second polarizing films 72.

In a first display area 81, the first one-quarter wavelength phase difference film 31, the first one-half wavelength phase difference film 51 and the first polarizing film 71 form a circular polarizer, reflected light, reflected by a second electrode 15 of the display components 10, of external light entering the stereoscopic display device from the first display area may be reduced, and thus the contrast of the stereoscopic display device is increased, and the display effect of the stereoscopic display device is further improved. Similarly, in a second display area 82, the second one-quarter wavelength phase difference film 32, the second one-half wavelength phase difference film 52 and the second polarizing film 72 form a circular polarizer, reflected light, reflected by the second electrode 15 of the display components 10, of external light entering the stereoscopic display device from the second display area may be reduced, and thus the contrast of the stereoscopic display device is increased, and the display effect of the stereoscopic display device is further improved.

Moreover, in the embodiment of the present disclosure, the manner of combining the one-quarter wavelength phase difference film, the one-half wavelength phase difference film and the polarizer may improve the optical performance of the circular polarizers, so that the stereoscopic display device is better in anti-reflection performance. In addition, in order to simplify the structure of the stereoscopic display device, the one-half wavelength phase difference film may be omitted.

Specifically, in the stereoscopic display device provided by the present disclosure, referring to FIG. 2, an angle between a slow axis direction of the first one-quarter wavelength phase difference films 31 and the absorption axis direction of the first polarizing films 71 is 75°;

an angle between a slow axis direction of the second one-quarter wavelength phase difference films 32 and the absorption axis direction of the second polarizing films 72 is 75°;

an angle between a slow axis direction of the first one-half wavelength phase difference films 51 and the absorption axis direction of the first polarizing films 71 is 15°; and an angle between a slow axis direction of the second one-half wavelength phase difference films 52 and the absorption axis direction of the second polarizing films 72 is 15°.

Figure 5:
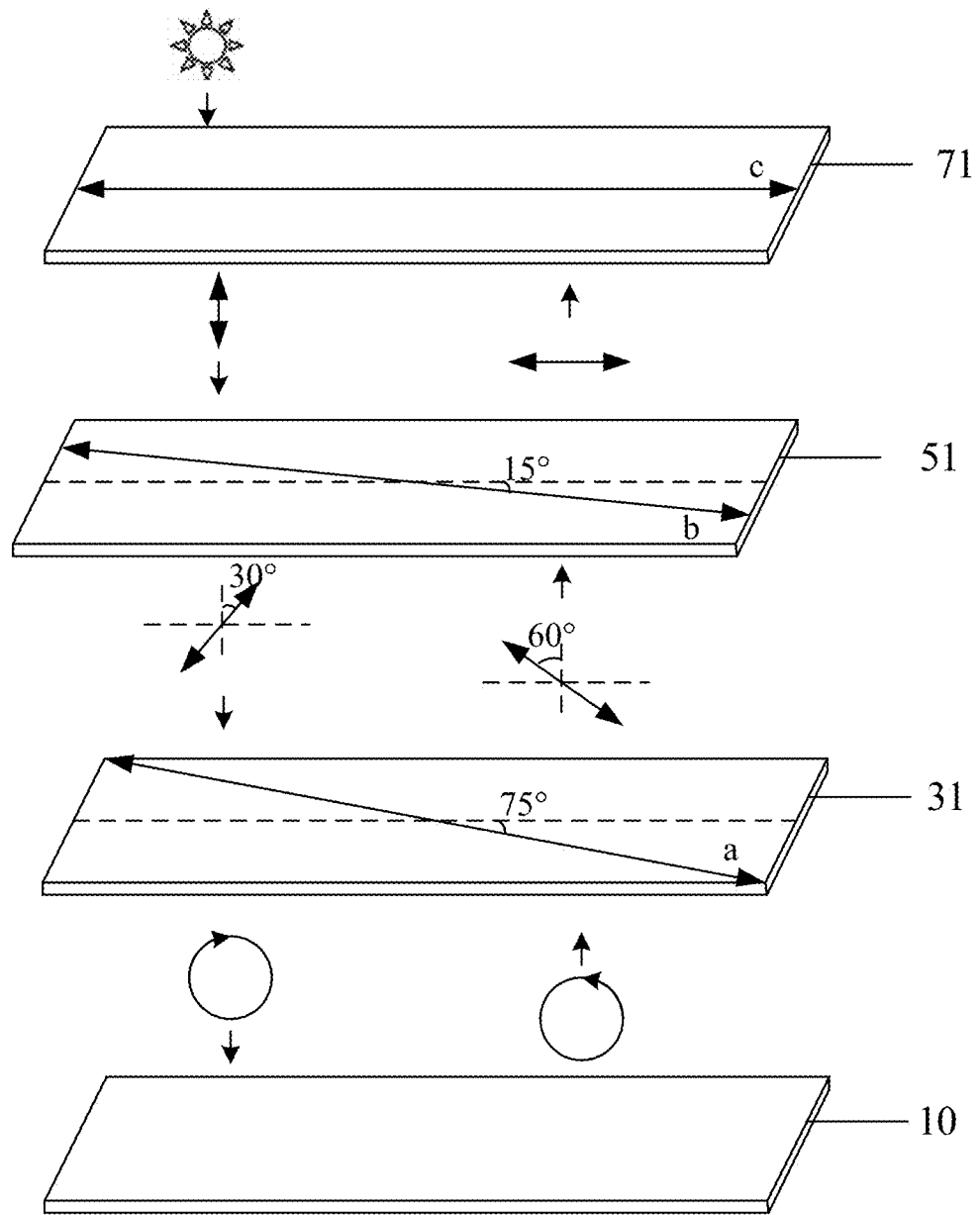
FIG. 5 is a schematic diagram of an anti-reflection principle of a stereoscopic display apparatus according to an embodiment of the present disclosure.

FIG. 5 is a simplified schematic structural diagram of the optical film layers in a first display area. The anti-reflection principle of the stereoscopic display device is described in detail below with one of the first display areas as an example.

When external light (generally natural light) irradiates to the first polarizing film 71, only a vibration component perpendicular to the absorption axis direction c of the first polarizing film 71 can pass through, so that the natural light is converted into linearly polarized light. Then the linearly polarized light irradiates to the first one-half wavelength phase difference film 51, and since the angle between the slow axis direction b of the first one-half wavelength phase difference film 51 and the absorption axis direction c of the first polarizing film 71 is 15°, after the linearly polarized light passes through the first one-half wavelength phase difference film 51, the vibration direction of the linearly polarized light is deflected by 30°. In this case, an angle between the vibration direction of the linearly polarized light and the slow axis direction a of the first one-quarter wavelength phase difference film 31 is 45°, so that the linearly polarized light is converted into circularly polarized light after passing through the first one-quarter wavelength phase difference film 31, where right-handed circularly polarized light is taken as an example in the drawing. Afterwards, the right-handed circularly polarized light is emitted into the display components 10 and is reflected by the second electrode in the display components 10 so as to be converted into left-handed circularly polarized light. Then the left-handed circularly polarized light is emitted into the first one-quarter wavelength phase difference film 31, and with the polarization state changed, the left-handed circularly polarized light is converted into linearly polarized light with an angle of 30° between the vibration direction and the direction c. After the linearly polarized light passes through the first one-half wavelength phase difference film 51 again, the vibration direct is rotated by 30°, and the light is converted into linearly polarized light parallel to the direction c so as not to be emitted from the first polarizing film 71, so that the external light irradiating to the stereoscopic display device cannot be emitted from a light emitting side after being reflected by the display components 10, and the display effect of the stereoscopic display device cannot be affected.

The anti-reflection principle of the second display areas is similar to that of the first display areas, which will not be repeated here.

Specifically, in the stereoscopic display apparatus provided by the embodiment of the present disclosure, the first one-quarter wavelength phase difference films and the second one-quarter wavelength phase difference films each include a polymeric liquid crystal material.

As shown in FIG. 2, the stereoscopic display device further includes:

first optical alignment films 21, disposed between the display components 10 of the first display areas 81 and the first one-quarter wavelength phase difference films 31; and second optical alignment films 22, disposed between the display components 10 of the second display areas 82 and the second one-quarter wavelength phase difference films 32;

where an alignment direction of the first optical alignment films 21 is perpendicular to that of the second optical alignment films 22.

The first optical alignment films 21 are formed above the display components 10 of the first display areas 81, the second optical alignment films 22 are formed above the display components 10 of the second display areas 82, the first one-quarter wavelength phase difference films 31 are formed on the first optical alignment films 21 through the polymeric liquid crystal material, and the second one-quarter wavelength phase difference films 32 are formed on the second optical alignment films 22 through the polymeric liquid crystal material, so that the integration level and integrity of the stereoscopic display device may be improved. The first optical alignment films 21 cause liquid crystal molecules in the first one-quarter wavelength phase difference films 31 distributed in the alignment direction of the first optical alignment films 21, and the second optical alignment films 22 cause liquid crystal molecules in the second one-quarter wavelength phase difference films 32 distributed in the alignment direction of the second optical alignment films 22. An angle between the alignment direction of the first optical alignment films and the absorption axis direction of the first polarizing films may be, but not merely, 75° or 105°, and an angle between the alignment direction of the second optical alignment films and the absorption axis direction of the second polarizing films may be, but not merely, 75° or 105°.

Since the first one-quarter wavelength phase difference films cover most visible light, the external light is converted into the linearly polarized light after entering the stereoscopic display device through the first polarizing films, and the linearly polarized light is rotated through the first one-quarter wavelength phase difference films to form emitted light. The polarization direction of the emitted light is parallel to the absorption axis of the first polarizing films, and thus the emitted light cannot be emitted from the first polarizing films. By the cooperation of the first one-quarter wavelength phase difference films and the first polarizing films, light emitted from the first polarizing films is reduced, after external light entering the display components from the first display areas is reflected by the second electrodes (metal cathodes) in the display components, thereby increasing the contrast of the stereoscopic display device and further improving the display effect of the stereoscopic display device. The second one-quarter wavelength phase difference films have the effects similar to those of the first one-quarter wavelength phase difference films, which will not be repeated here.

Specifically, the polymeric liquid crystal material in the first one-quarter wavelength phase difference films and the second one-quarter wavelength phase difference films may be, but not merely, positive optical liquid crystals.

During specific implementation, in the stereoscopic display device provided by the embodiment of the present disclosure, the first one-half wavelength phase difference films and the second one-half wavelength phase difference films each include a polymeric liquid crystal material.

As shown in FIG. 2, the stereoscopic display device further includes:

third optical alignment films 41, disposed between the first one-quarter wavelength phase difference films 31 of the first display areas 81 and the first one-half wavelength phase difference films 51; and fourth optical alignment films 42, disposed between the second one-quarter wavelength phase difference films 32 of the second display areas 82 and the second one-half wavelength phase difference films 52;

where an alignment direction of the third optical alignment films 41 is perpendicular to that of the fourth optical alignment films 42.

The third optical alignment films 41 are formed on the first one-quarter wavelength phase difference films 31 of the first display areas 81, the fourth optical alignment films 42 are formed on the second one-quarter wavelength phase difference films 32 of the second display areas 82, the first one-half wavelength phase difference films 51 are formed on the third optical alignment films 41 through the polymeric liquid crystal material, and the second one-half wavelength phase difference films 52 are formed on the fourth optical alignment films 42 through the polymeric liquid crystal material, so that the integration level and integrity of the stereoscopic display device may be improved. The third optical alignment films cause liquid crystals in the first one-half wavelength phase difference films distributed in the alignment direction of the third optical alignment films, and the fourth optical alignment films cause liquid crystals in the second one-half wavelength phase difference films distributed in the alignment direction of the fourth optical alignment films. An angle between the alignment direction of the third optical alignment films and the absorption axis direction of the first polarizing films may be, but not merely, 15° or 165°, and an angle between the alignment direction of the fourth optical alignment films and the absorption axis direction of the second polarizing films may be, but not merely, 15° or 165°.

By the corporation of the first (or second) one-quarter wavelength phase difference films, the first (or second) one-half wavelength phase difference films and the first (or second) polarizing films, light emitted from the first polarizing films is further reduced, after the external light entering the display components from the first display areas is reflected by the second electrodes (metal cathodes) in the display components, thereby further increasing the contrast of the stereoscopic display device and further improving the display effect of the stereoscopic display device.

Specifically, the polymeric liquid crystal material in the first one-half wavelength phase difference films and the second one-half wavelength phase difference films may be, but not merely, positive optical liquid crystals.

In practical applications, in the stereoscopic display device provided by the embodiment of the present disclosure, the first polarizing films include dichroic dyes and polymeric liquid crystal mixtures, and the second polarizing films include dichroic dyes and polymeric liquid crystal mixtures.

As shown in FIG. 2, the stereoscopic display device further includes:

fifth optical alignment films 61, disposed between the first one-half wavelength phase difference films 51 of the first display areas 81 and the first polarizing films 71; and sixth optical alignment films 62, disposed between the second one-half wavelength phase difference films 52 of the second display areas 82 and the second polarizing films 72;

where an alignment direction of the fifth optical alignment films 61 is perpendicular to that of the sixth optical alignment films 62.

The fifth optical alignment films cause liquid crystal molecules in the first polarizing films distributed in the alignment direction of the fifth optical alignment films, the sixth optical alignment films cause liquid crystal molecules in the second polarizing films distributed in the alignment direction of the sixth optical alignment films, and the alignment direction of the fifth optical alignment films is perpendicular to that of the sixth optical alignment films, so that the integration level and integrity of the stereoscopic display device are improved, the thickness of the stereoscopic display device can be reduced, so that the stereoscopic display device is thinner.

For example, the absorption axis of the first polarizing films may be set to be 0°, the absorption axis of the second polarizing films may be set to be 90°. The alignment direction of the fifth optical alignment films may be set to be 0°, and the alignment direction of the sixth optical alignment films may be set to be 90°. A slow axis of the first one-half wavelength phase difference film may be set to be 15°, and a slow axis of the second one-half wavelength phase difference film may be set to be 105°. The alignment direction of the third optical alignment films may be set to be 15°, and the alignment direction of the fourth optical alignment films may be set to be 105°. A slow axis of the first one-quarter wavelength phase difference films may be set to be 75°, and a slow axis of the second one-quarter wavelength phase difference films may be set to be 165°. The alignment direction of the first optical alignment films may be set to be 75°, and the alignment direction of the second optical alignment films may be set to be 165°. It should be noted that here are just examples, and in specific implementation, the angles of the film layers may be set according to actual conditions, which will not be limited here.

Figure 6:
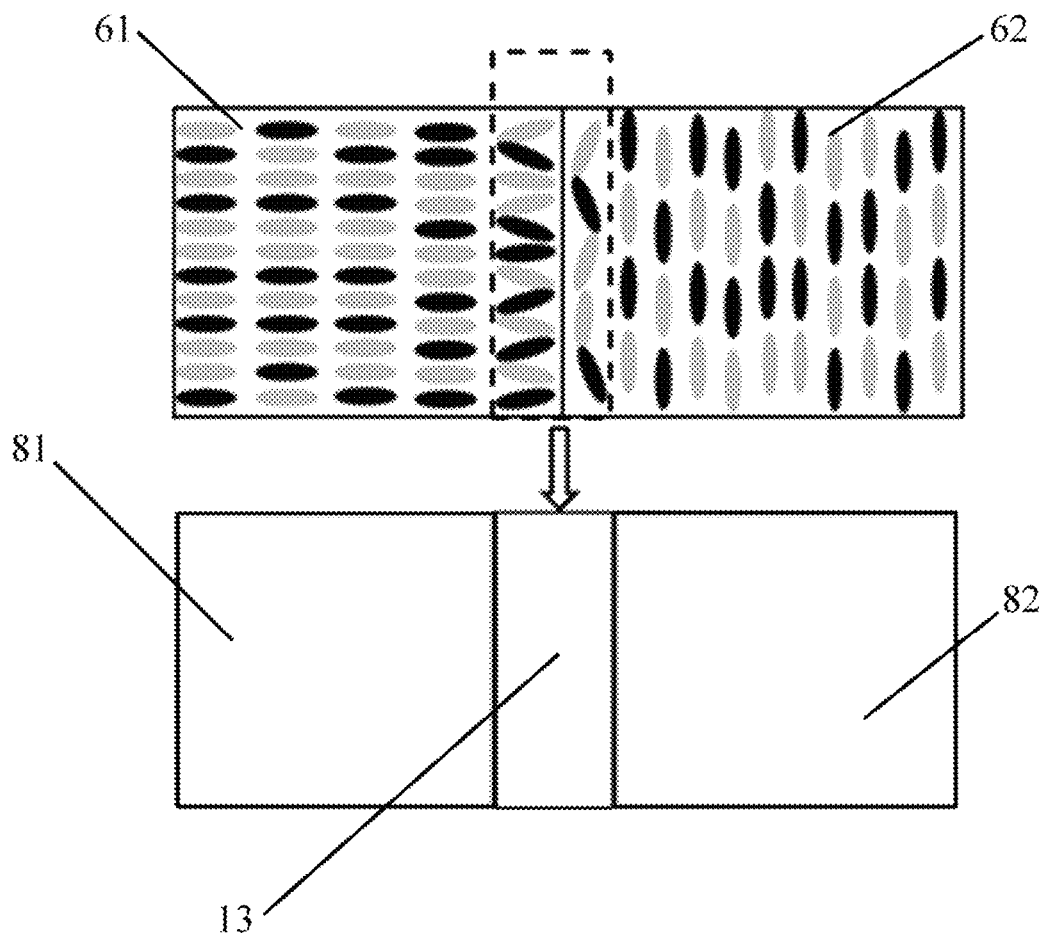
FIG. 6 is a schematic structural diagram of relative positions of a first display area, a second display area and a shading part of a stereoscopic display apparatus according to an embodiment of the present disclosure.

Optionally, in the stereoscopic display device provided by the embodiment of the present disclosure, referring to FIG. 2 and FIG. 6, the stereoscopic display device may further include: a pixel defining layer configured to separate the display components 10.

The pixel defining layer includes: shading parts 13, each located at a position between a pair of adjacent first display areas 81 and second display areas 82.

In the embodiment of the present disclosure, since the optical alignment films in the first display areas 81 and the second display areas 82 are different in alignment direction, one of the fifth optical alignment films 61 and one of the sixth optical alignment films 62 are taken as an example in FIG. 6. Due to the different alignment directions of the contact area between the adjacent fifth optical alignment film 61 and sixth optical alignment film 62, disordered liquid crystals will appear in the adjacent regions of adjacent fifth optical alignment film and sixth optical alignment film, resulting in failure of reflection-reducing polarization. By arranging the shading part between pixel layers of a pair of adjacent first and second display areas, emitted light from regions where liquid crystals are disordered can be reduced, and therefore the influence of disordered liquid crystals on the display effect of the stereoscopic display device is reduced.

Specifically, in the stereoscopic display device provided by the embodiment of the present disclosure, the shading parts include black resin materials. The shading parts may have the good shading effect by being made of the black resin materials, in addition, the shading parts may also be made of other light-impermeable materials, which is not limited herein.

Specifically, in the stereoscopic display device provided by the embodiment of the present disclosure, as shown in FIG. 2, the display components 10 of a display area include: a first electrode 16 located above the base substrate 1, the second electrode 15 located on one side, facing away from the base substrate 1, of the first electrode 16, and a light emitting layer 11 located between the first electrode 16 and the second electrode 15. For example, the first electrode 16 may be an anode, the second electrode 15 may be a cathode, and the second electrodes 15 of the display components 10 in the stereoscopic display device are located on the same film layer.

The pixel defining layer are located between the base substrate 1 and the second electrodes 15. The pixel defining layer at a position between a pair of adjacent first display area 81 and second display area 82 are made of a shading material to form the shading part 13, and the other film layers will not be affected. The parts, other than the shading parts 13, of the pixel defining layer may be made of light permeable materials, e.g., a transparent polyimide material.

In addition, the stereoscopic display device may further include driving circuits 17 located between the base substrate 1 and the first electrodes 16, and the encapsulation layer 14 located on the sides, facing away from the base substrate 1, of the second electrodes 15. The driving circuits 17 may control light emitting of the display components 10, and the encapsulation layer 14 may prevent moisture and oxygen from entering the display components 10.

Based on the same inventive concept, an embodiment of the present disclosure further provides a method for manufacturing the above stereoscopic display device. Due to the fact that the principle of solving problems of the manufacturing method is similar to that of the above stereoscopic display apparatus, implementation of the manufacturing method may refer to the implementation of the above stereoscopic display device, and repeated parts are omitted.

Figure 7:
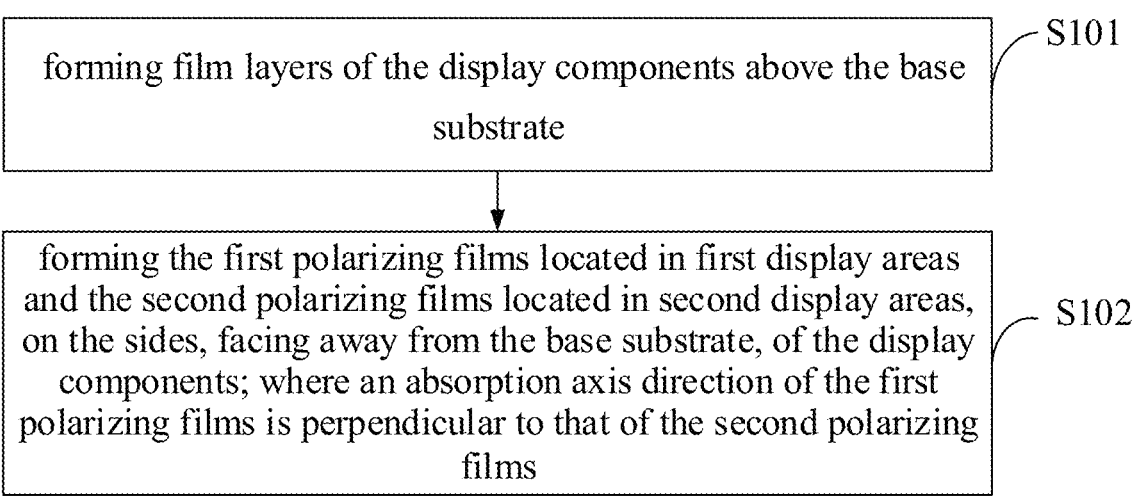
FIG. 7 is a flowchart of a manufacturing method for the above stereoscopic display apparatus provided according to the embodiment of the present disclosure.

As shown in FIG. 7, the method for manufacturing the above stereoscopic display device provided by the embodiment of the present disclosure may include the following steps:

S101, forming film layers of the display components above the base substrate; and S102, forming the first polarizing films located in first display areas and the second polarizing films located in second display areas, on the sides, facing away from the base substrate, of the display components; where an absorption axis direction of the first polarizing films is perpendicular to that of the second polarizing films.

According to the manufacturing method provided by the embodiment of the present disclosure, the first polarizing films located in the first display areas and the second polarizing films located in the second display areas are formed on the sides, facing away from the base substrate, of the display components. Compared with directly pasting manufactured polarizers to the surfaces of the display components, the embodiment of the present disclosure can more easily form polarizing films having different absorption axis directions at the light emitting sides of the display components, the thickness of the stereoscopic display device can be reduced, and the stereoscopic display device is thinner and higher in integration level.

Specifically, referring to FIG. 2, in S101, the display components 10 of a display area may include: a first electrode 16, a light emitting layer 11 and a second electrode 15 which are arranged in sequence. The stereoscopic display device may further include driving circuits 17 located between the base substrate 1 and the first electrodes 16, and an encapsulation layer 14 located on the sides, facing away from the base substrate 1, of the second electrodes 15.

In the embodiment of the present disclosure, the polarization direction of light which is emitted from the first display areas and passes through the first polarizing films is perpendicular to that of light which is emitted from the second display areas and passes through the second polarizing films, in cooperation with stereoscopic glasses, a displayed image of the first display areas and a displayed image of the second display areas will respectively enter different eyes of a person, thereby realizing stereoscopic display.

Figure 8:
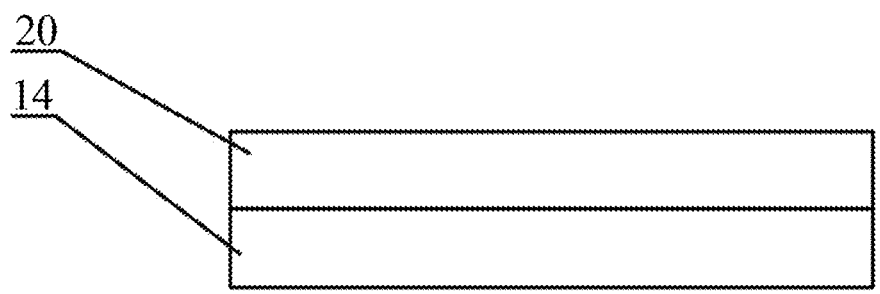
FIG. 8 is a schematic structural diagram of forming a first optical alignment layer above an encapsulation layer in a manufacturing method for a stereoscopic display apparatus according to an embodiment of the present disclosure.

During specific implementation, in the manufacturing method provided by the embodiment of the present disclosure, after S101 and before S102, the method may further include:

coating a first optical alignment layer over the display components, which, with reference to FIG. 8, may form a first optical alignment layer 20 on the encapsulation layer 14, and performing pre-curing and main curing for the first optical alignment layer 20.

Figure 9:
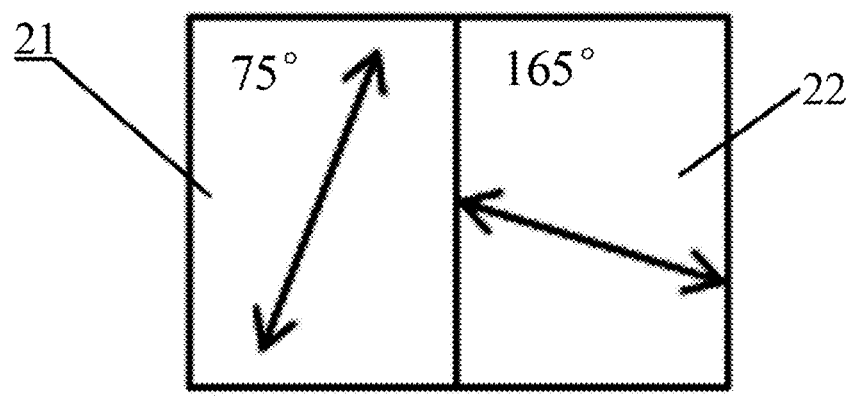
FIG. 9 is schematic structural diagram of a first optical alignment film and a second optical alignment film of a stereoscopic display apparatus according to an embodiment of the present disclosure.

As shown in FIG. 9, a photo-alignment process is performed on the first optical alignment layer located in the first display area to form a first optical alignment film 21. Specifically, the second display area may be shielded by a mask, and ultraviolet light irradiates to the first optical alignment layer in the first display area to complete the photo-alignment process on the first optical alignment layer in the first display area.

Another photo-alignment process is performed on the first optical alignment layer located in the second display area to form a second optical alignment film 22. An alignment direction of the first optical alignment film 21 is perpendicular to that of the second optical alignment film 22. Specifically, the first display area may be shielded by a mask, and ultraviolet light irradiates to the second optical alignment layer in the second display area to complete the photo-alignment on the first optical alignment layer in the second display area.

Figure 10:
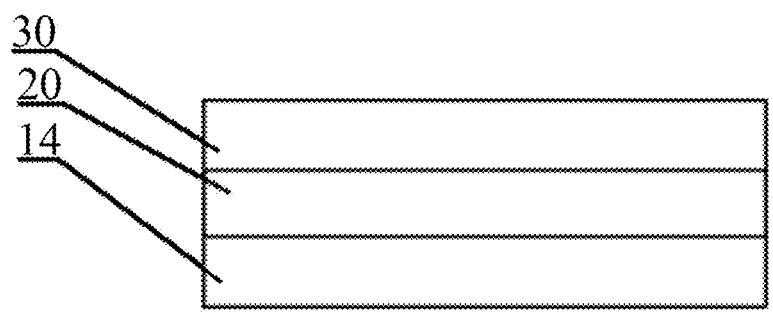
FIG. 10 is a schematic structural diagram of forming a one-quarter wavelength phase difference film layer in a manufacturing method for a stereoscopic display apparatus according to an embodiment of the present disclosure.
Figure 11:
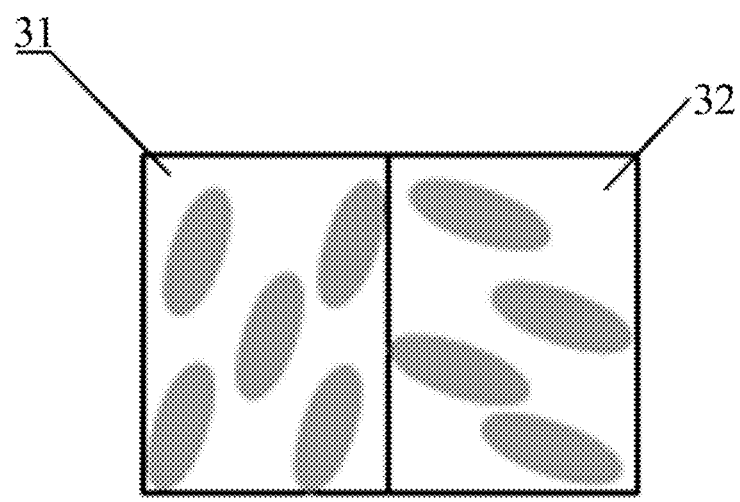
FIG. 11 is a schematic structural diagram of a first one-quarter wavelength phase difference film and a second one-quarter wavelength phase difference film of a stereoscopic display apparatus according to an embodiment of the present disclosure.

Referring to FIG. 10, the first optical alignment film and the second optical alignment film (i.e., the first optical alignment layer 20) are coated with a polymeric liquid crystal material 30, and the polymeric liquid crystal material 30 is cured, e.g., with ultraviolet light irradiation, to form a first one-quarter wavelength phase difference film 31 and a second one-quarter wavelength phase difference film 32. The liquid crystal distribution directions in the first one-quarter wavelength phase difference film 31 and the second one-quarter wavelength phase difference film 32 are shown in FIG. 11.

Figure 12:
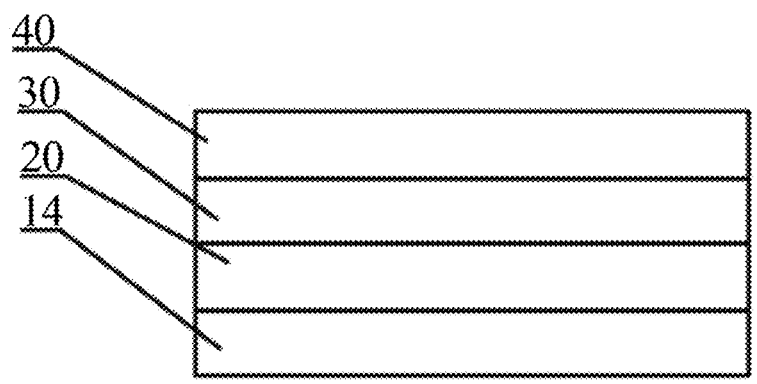
FIG. 12 is a schematic structural diagram of forming a second optical alignment layer in a manufacturing method for a stereoscopic display apparatus according to an embodiment of the present disclosure.
Figure 13:
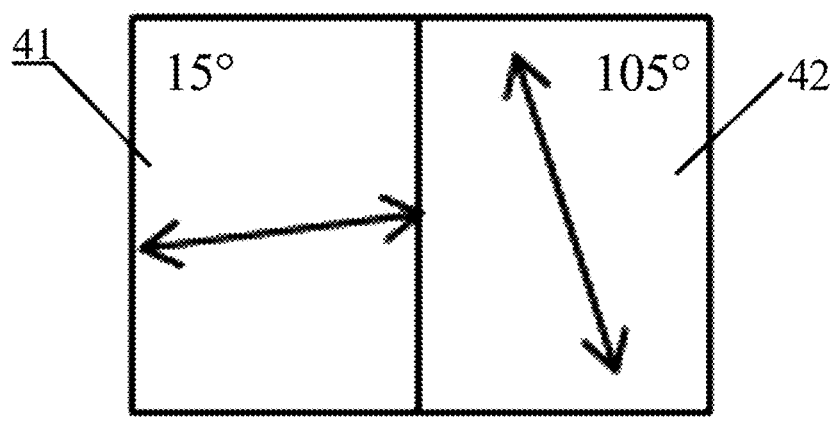
FIG. 13 is a schematic structural diagram of a third optical alignment film and a fourth optical alignment film of a stereoscopic display apparatus according to an embodiment of the present disclosure.
Figure 14:
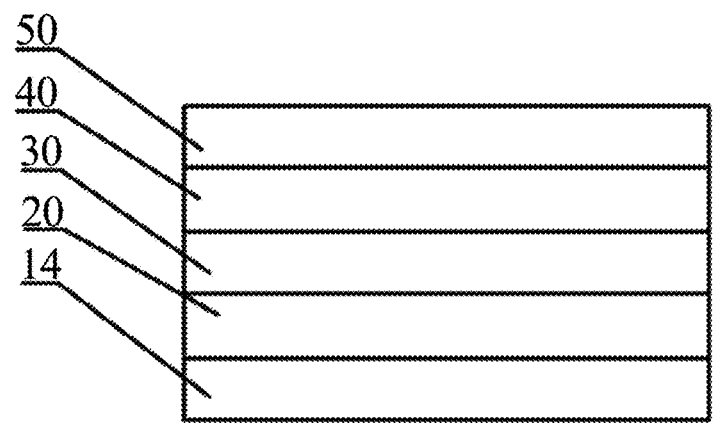
FIG. 14 is a schematic structural diagram of forming a one-half wavelength phase difference film layer in a manufacturing method for a stereoscopic display apparatus according to an embodiment of the present disclosure.
Figure 15:
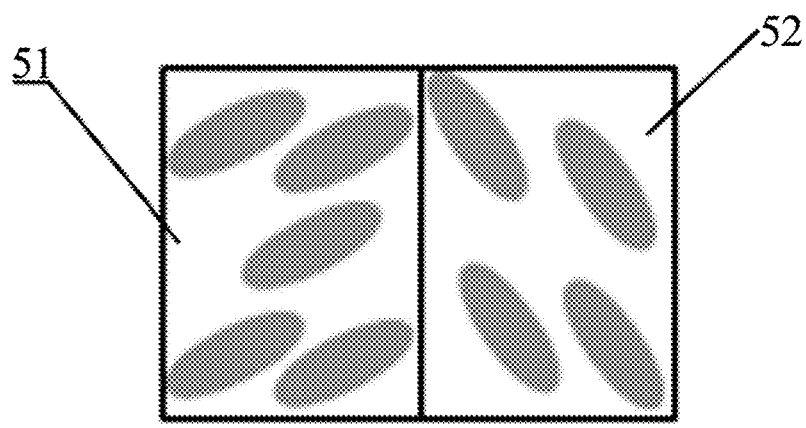
FIG. 15 is a schematic structural diagram of a first one-half wavelength phase difference film and a second one-half wavelength phase difference film of a stereoscopic display apparatus according to an embodiment of the present disclosure.

During specific implementation, in the manufacturing method provided by the embodiment of the present disclosure, after the first one-quarter wavelength phase difference films and the second one-quarter wavelength phase difference films are formed and before S102, the method may further include:

referring to FIG. 12, coating a second optical alignment layer 40 over the first one-quarter wavelength phase difference film and the second one-quarter wavelength phase difference film (i.e., on the film layer 30 in the drawing), and performing pre-curing and main curing for the second optical alignment layer 40;

referring to FIG. 13, performing a photo-alignment process for the second optical alignment layer located in the first display area to form a third optical alignment film 41, where the photo-alignment process can be completed by shielding the second display area with a mask, and irradiating the second optical alignment layer in the first display area with ultraviolet light;

performing another photo-alignment for the second optical alignment layer located in the second display area to form a fourth optical alignment film 42, where the photo-alignment process can be completed by shielding the first display area with a mask, and irradiating the second optical alignment layer in the second display area with ultraviolet light;

referring to FIG. 14, coating a polymeric liquid crystal material 50 over the third optical alignment film and the fourth optical alignment film (i.e., on the film layer 40 in the drawing), and curing the polymeric liquid crystal material 50, e.g., with ultraviolet light irradiation, to form a first one-half wavelength phase difference film 51 and a second one-half wavelength phase difference film 52. The liquid crystal distribution directions in the first one-half wavelength phase difference film 51 and the second one-half wavelength phase difference film 52 are shown in FIG. 15.

Figure 16:
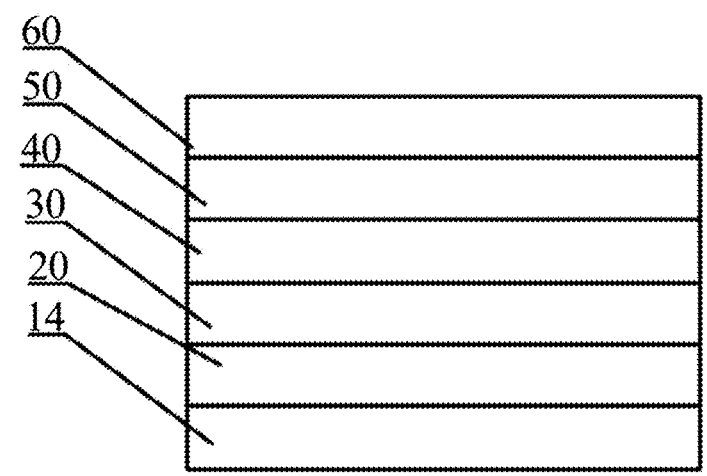
FIG. 16 is a schematic structural diagram of a third optical alignment layer in a manufacturing method for a stereoscopic display apparatus according to an embodiment of the present disclosure.
Figure 17:
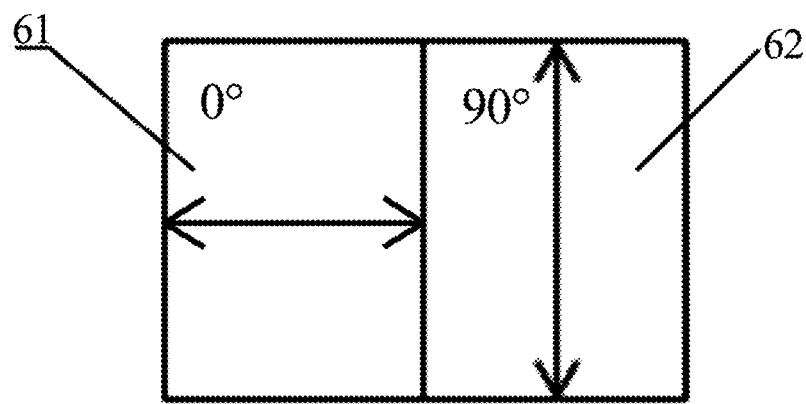
FIG. 17 is a schematic structural diagram of a fifth optical alignment film and a sixth optical alignment film of a stereoscopic display apparatus according to an embodiment of the present disclosure.
Figure 18:
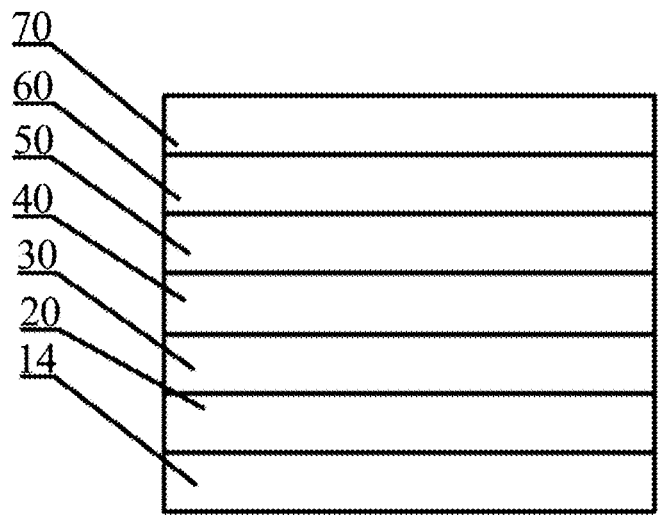
FIG. 18 is a schematic structural diagram of forming a polarizing film layer in a manufacturing method for a stereoscopic display apparatus according to an embodiment of the present disclosure.
Figure 19:
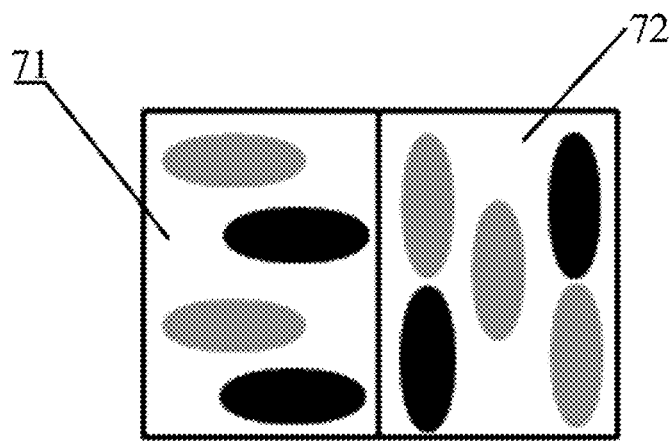
FIG. 19 is schematic structural diagram of a first polarizing film and a second polarizing film of a stereoscopic display apparatus according to an embodiment of the present disclosure.

Specifically, in the manufacturing method provided by the embodiment of the present disclosure, after the first one-half wavelength phase difference films and the second one-half wavelength phase difference films are formed and before S102, the method may further include:

referring to FIG. 16, coating a third optical alignment layer 60 over the first one-half wavelength phase difference film and the second one-half wavelength phase difference film (i.e., on the film layer 50 in the drawing), and performing pre-curing and main curing for the third optical alignment layer 60;

referring to FIG. 17, performing a photo-alignment process for the third optical alignment layer located in the first display area to form a fifth optical alignment film 61, where the photo-alignment process can be completed by shielding the second display area with a mask, and irradiating the third optical alignment layer in the first display area with ultraviolet light;

performing another photo-alignment process for the third optical alignment layer located in the second display area to form a sixth optical alignment film 62. An alignment direction of the fifth optical alignment film 61 is perpendicular to that of the sixth optical alignment film 62. Specifically, the first display area may be shielded by a mask, and ultraviolet light irradiates to the third optical alignment layer in the second display area to complete the photo-alignment process on the third optical alignment layer in the second display area;

S102 may include:

referring to FIG. 18, coating dichroic dyes and polymeric liquid crystal mixtures 70 over the fifth optical alignment film and the sixth optical alignment film (i.e., on the film layer 60 in the drawing), and curing the dichroic dyes and polymeric liquid crystal mixtures 70 to form the first polarizing film and the second polarizing film. The liquid crystal distribution directions in the first polarizing film 71 and the second polarizing film 72 are shown in FIG. 19.

Dichroic dye will absorb light parallel to the absorption axis direction thereof, and light perpendicular to the absorption axis direction thereof will pass through the dichroic dye. In dichroic dye display, various light absorption features are determined according to its dye structure, and the dichroic dye usually absorbs specific wavelengths (e.g., red, blue and yellow), so that black is hard to display by using single dye. To this end, black is displayed generally by mixing three or more of a plurality of types of dichroic dye. Generally speaking, it is considered that the wavelength range of visible light is from 380 nm to 780 nm, and if light absorption is constant in this range, "black" is determined. However, considering a standard sensation curve of dark adaptation relative to human visual sensitivity, light absorption is constant within the wavelength range of 400 nm to 650 nm desirably. Therefore, the dichroic dye is selected according to the requirements: first, the selectively-absorbable wavelength dispersion of a dichroic dye composition is from 450 nm to 650 nm, and second, the dichroic dye has high enough solubility in liquid crystals.

In the embodiment of the present disclosure, the first (or second) one-quarter wavelength phase difference films, the first (or second) one-half wavelength phase difference films and the first (or second) polarizing films are formed on the display components, so that the integration level and integrity of the stereoscopic display device are improved.

Further, in the manufacturing method provided by the embodiment of the present disclosure, referring to FIG. 2 and FIG. 6, the method may further include: forming shading parts 13 above the base substrate 1 by using black resin materials, each located at a position between a pair of adjacent the first display area 81 and the second display area 82. The shading parts may have a good shading effect by being made of the black resin materials. In addition, the shading parts may also be made of other light-impermeable materials, which is not limited herein.

In the embodiment of the present disclosure, since the optical alignment films in the first display areas 81 and the second display areas 82 have different alignment directions, one of the fifth optical alignment films 61 and one of the sixth optical alignment films 62 are taken as an example in FIG. 6. Since the fifth optical alignment film 61 and the adjacent sixth optical alignment film 62 have different alignment directions in the contact region, disordered liquid crystals will appear in the adjacent regions of the fifth optical alignment film and the sixth optical alignment film, resulting in failure of reflection-reducing polarization. By arranging the shading parts between pixel layers of the first display areas and pixel layers of the second display areas, emitted light from regions where liquid crystals are disordered can be reduced, and therefore the influence of disordered liquid crystals on the display effect of the stereoscopic display device is reduced.

According to the stereoscopic display device and the method for manufacturing thereof provided by the embodiments of the present disclosure, by forming the first polarizing films located in the first display areas and the second polarizing films located in the second display areas on the sides, facing away from the base substrate, of the display components, compared with directly pasting the manufactured polarizers to the surfaces of the display components, the embodiment of the present disclosure may more easily form the polarizing films having different absorption axis directions on the light emitting sides of the display components, and the thickness of the stereoscopic display device may be reduced, so that the stereoscopic display device is thinner and higher in integration level.

The above description is only exemplary embodiments of the present disclosure and an explanation of the technical principles used. It should be understood by those skilled in the art that the scope of disclosure involved in the present disclosure is not limited to the technical solutions formed by the specific combination of the above technical features, but also covers other technical solutions formed by the arbitrary combination of the above technical features or their equivalent features without departing from the public concept, for example, the technical solution formed by replacing the above features with (but not limited to) the technical features with similar functions disclosed in the present disclosure.

What is claimed is:

1. A stereoscopic display device comprising first display areas and second display areas alternately provided, wherein the stereoscopic display device further comprises:
    a base substrate;
    a plurality of display components, located above the base substrate of one first display area and one second display area;
    a first polarizing film, disposed on one side, facing away from the base substrate, of the display components of the first display area; and
    a second polarizing film, disposed on one side, facing away from the base substrate, of the display components of the second display area; wherein
    an absorption axis direction of the first polarizing film is perpendicular to an absorption axis direction of the second polarizing film;
    the stereoscopic display device further comprises:
    a first one-quarter wavelength phase difference film, disposed between the display components of the first display area and the first polarizing film;
    a second one-quarter wavelength phase difference film, disposed between the display components of the second display area and the second polarizing film;
    a first one-half wavelength phase difference film, disposed between the first one-quarter wavelength phase difference film of the first display area and the first polarizing film; and
    a second one-half wavelength phase difference film, disposed between the second one-quarter wavelength phase difference film of the second display area and the second polarizing film;
    wherein the first one-quarter wavelength phase difference film and the second one-quarter wavelength phase difference film each comprise a polymeric liquid crystal material, and the first one-half wavelength phase difference film and the second one-half wavelength phase difference film each comprise a polymeric liquid crystal material; and
    the stereoscopic display device further comprises:
    a first optical alignment film, disposed between the display components of the first display area and the first one-quarter wavelength phase difference film;
    a second optical alignment film, disposed between the display components of the second display area and the second one-quarter wavelength phase difference film;
    a third optical alignment film, disposed between the first one-quarter wavelength phase difference film of the first display area and the first one-half wavelength phase difference film; and
    a fourth optical alignment film, disposed between the second one-quarter wavelength phase difference film of the second display area and the second one-half wavelength phase difference film;
    wherein an alignment direction of the first optical alignment film in the first display area is perpendicular to an alignment direction of the second optical alignment film in the second display area, and an alignment direction of the third optical alignment film in the first display area is perpendicular to an alignment direction of the fourth optical alignment film in the second display area;
    wherein the first optical alignment film and the second optical alignment film are arranged in a same layer, and the third optical alignment film and the fourth optical alignment film are arranged in a same layer.

2. The stereoscopic display device of claim 1, wherein:
    an angle between a slow axis direction of the first one-quarter wavelength phase difference film and the absorption axis direction of the first polarizing film is 75°;
    an angle between a slow axis direction of the second one-quarter wavelength phase difference film and the absorption axis direction of the second polarizing film is 75°;
    an angle between a slow axis direction of the first one-half wavelength phase difference film and the absorption axis direction of the first polarizing film is 15°; and
    an angle between a slow axis direction of the second one-half wavelength phase difference film and the absorption axis direction of the second polarizing film is 15°.

3. The stereoscopic display device of claim 1, wherein the first polarizing film comprises dichroic dyes and polymeric liquid crystal mixtures, and the second polarizing film comprises dichroic dyes and polymeric liquid crystal mixtures; and
    the stereoscopic display device further comprises:
    a fifth optical alignment film, disposed between the first one-half wavelength phase difference film of the first display area and the first polarizing film; and
    a sixth optical alignment film, disposed between the second one-half wavelength phase difference film of the second display area and the second polarizing film; wherein
    an alignment direction of the fifth optical alignment film is perpendicular to an alignment direction of the sixth optical alignment film.

4. The stereoscopic display device of claim 1, wherein:
    the first display areas and the second display areas are alternately distributed in a first direction; and/or
    the first display areas and the second display areas are alternately distributed in a second direction; wherein the second direction crosses the first direction.

5. The stereoscopic display device of claim 1, further comprising: a pixel defining layer configured to separate the display components; wherein
    the pixel defining layer comprises: shading parts, each located at a position between a pair of adjacent the first and second display areas.

6. The stereoscopic display device of claim 5, wherein the shading parts comprise black resin materials.

7. A method for manufacturing the stereoscopic display device of claim 1, comprising:
    forming film layers of the display components above the base substrate; and
    forming the first polarizing film located in the first display area and the second polarizing film located in the second display area, on one side, facing away from the base substrate, of the display components;
    wherein the absorption axis direction of the first polarizing film is perpendicular to the absorption axis direction of the second polarizing film;

wherein after the film layers of the display components are formed above the base substrate, and before the first polarizing film located in the first display area and the second polarizing film located in the second display area are formed on the side, facing away from the base substrate, of the display components, the method further comprises:

coating a first optical alignment layer over the display components;

performing a photo-alignment process for the first optical alignment layer located in the first display area to form the first optical alignment film;

performing another photo-alignment process for the first optical alignment layer located in the second display area to form the second optical alignment film, wherein an alignment direction of the first optical alignment film is perpendicular to an alignment direction of the second optical alignment film; and coating polymeric liquid crystal materials over the first optical alignment film and the second optical alignment film, and curing the polymeric liquid crystal materials to form the first one-quarter wavelength phase difference film and the second one-quarter wavelength phase difference film;

wherein after the first one-quarter wavelength phase difference film and the second one-quarter wavelength phase difference film are formed, and before the first polarizing film located in the first display area and the second polarizing film located in the second display area are formed on the side, facing away from the base substrate, of the display components, the method further comprises:

coating a second optical alignment layer over the first one-quarter wavelength phase difference film and the second one-quarter wavelength phase difference film;

performing a photo-alignment process for the second optical alignment layer located in the first display area to form the third optical alignment film;

performing another photo-alignment process for the second optical alignment layer located in the second display area to form the fourth optical alignment film, wherein an alignment direction of the third optical alignment film is perpendicular to an alignment direction of the fourth optical alignment film; and coating polymeric liquid crystal materials over the third optical alignment film and the fourth optical alignment film, and curing the polymeric liquid crystal materials to form the first one-half wavelength phase difference film and the second one-half wavelength phase difference film.

8. The method of claim 7, wherein after the first one-half wavelength phase difference film and the second one-half wavelength phase difference film are formed, and before the first polarizing film located in the first display area and the second polarizing film located in the second display area are formed on the side, facing away from the base substrate, of the display components, the method further comprises:

coating a third optical alignment layer over the first one-half wavelength phase difference film and the second one-half wavelength phase difference film;

performing a photo-alignment process for the third optical alignment layer located in the first display area to form a fifth optical alignment film; and performing another photo-alignment process for the third optical alignment layer located in the second display area to form a sixth optical alignment film, wherein an alignment direction of the fifth optical alignment film is perpendicular to an alignment direction of the sixth optical alignment film; and the forming the first polarizing film located in the first display area and the second polarizing film located in the second display area on the side, facing away from the base substrate, of the display components, comprises:

coating dichroic dyes and polymeric liquid crystal mixtures over the fifth optical alignment film and the sixth optical alignment film, and curing the dichroic dyes and polymeric liquid crystal mixtures to form the first polarizing film and the second polarizing film.

9. The method of claim 7, further comprising:

forming shading parts above the base substrate by using black resin materials, each located at a position between a pair of adjacent the first and second display areas.

* * * * *